(12) United States Patent
Tushinskiy (10) Patent No.: US 11,776,007 B1
(45) Date of Patent: Oct. 3, 2023

(54) ENVIRONMENTAL AND CONTEXT-BASED CUSTOMIZATION OF ADVERTISEMENT MESSAGES

(71) Applicant: INSTREAMATIC, INC., Boca Raton, FL (US)

(72) Inventor: Stanislav Tushinskiy, Boca Raton, FL (US)

(73) Assignee: INSTREAMATIC, INC., Boca Raton, FL (US)

( * ) Notice: Subject to any disclaimer, the term of this patent is extended or adjusted under 35 U.S.C. 154(b) by 0 days.

(21) Appl. No.: 18/123,361

(22) Filed: Mar. 20, 2023

(51) Int. Cl.
*G06Q 30/0251* (2023.01)
*G10L 13/02* (2013.01)
*G10L 13/08* (2013.01)
*G06Q 30/0241* (2023.01)

(52) U.S. Cl.
CPC ..... *G06Q 30/0252* (2013.01); *G06Q 30/0261* (2013.01); *G06Q 30/0276* (2013.01); *G10L 13/02* (2013.01); *G10L 13/08* (2013.01)

(58) Field of Classification Search
CPC ........... G06Q 30/0252; G06Q 30/0261; G06Q 30/0276
See application file for complete search history.

(56) References Cited

U.S. PATENT DOCUMENTS

| 2017/0192982 A1* | 7/2017 | Glover | G06Q 30/0241 |
| 2021/0004873 A1* | 1/2021 | Bur | G06Q 10/063 |
| 2021/0208842 A1* | 7/2021 | Cassidy | G06F 3/165 |
| 2022/0076206 A1* | 3/2022 | MacTiernan | G06Q 30/0277 |

* cited by examiner

*Primary Examiner* — Azam A Ansari
(74) *Attorney, Agent, or Firm* — Georgiy L. Khayet (57) ABSTRACT

Systems and methods for providing environmental and context-based customized advertisement messages are provided. An example method includes receiving, from the application server, a request for advertisement. The request may include context parameters obtained by the application server via the application program running on the user device. The method further includes selecting, based on the context parameters, an advertisement media file from a database. The selected advertisement media file may be generated by an Artificial Intelligence model based on an advertisement message and the context parameters. The method further includes transmitting the selected advertisement media file to the application server. The application server may be configured to transmit the selected advertisement media file to the user device and the application program running on the user device may be configured to play back the selected advertisement media file to a user.

16 Claims, 6 Drawing Sheets

ENVIRONMENTAL AND CONTEXT-BASED CUSTOMIZATION OF ADVERTISEMENT MESSAGES

TECHNICAL FIELD

This disclosure generally relates to the field of providing advertisements. More particularly, this disclosure relates to methods and systems for providing environmental and context-based customized advertisement messages.

BACKGROUND

Many applications, such as, for example, games and media stream players, are widely used to deliver advertisements to users. Some applications are available to the users for free or allow the users to watch or listen to media streams for free in exchange for receiving advertisements. However, most advertisements indiscriminately target broad audiences. The current audio advertisements are not sufficiently targeted to specific users because they do not take into account the context in which the users listen to or watch advertisements. Accordingly, information provided in the advertisements may not be relevant to most users. Therefore, in order to increase the effectiveness of advertisements, there is a need for a convenient way to customize advertisement messages based on the context in which users listen to or watch the advertisement messages.

SUMMARY

This section introduces a selection of concepts in a simplified form that are further described in the Detailed Description section, below. This summary does not identify key or essential features of the claimed subject matter and is not intended to be an aid in determining the scope of the claimed subject matter.

According to an example embodiment, a method for providing environmental and context-based customized advertisement messages is provided. The method may be performed by an advertisement provider platform. The advertisement provider platform can be in communication with an application server. The application server can be in communication with an application program running on a user device. The method may include receiving, by the advertisement provider platform, a request for advertisement from the application server. The request may include context parameters obtained by the application server via the application program running on the user device. The method may include selecting, by the advertisement provider platform, based on the context parameters, an advertisement media file from a database. The selected advertisement media file can be generated by an Artificial Intelligence (AI) model based on an advertisement message and the context parameters. The method may include transmitting, by the advertisement provider platform, the selected advertisement media file to the application server. The application server can be configured to transmit the selected advertisement media file to the user device. The application program running on the user device can be configured to play back the selected advertisement media file to a user of the user device.

The database may include a plurality of advertisement media files pre-generated based on the same advertisement message and different sets of the context parameters. The method may further include determining that the database does not include a pre-generated advertisement media file matching the context parameters and, in response to the determination, generating, using the AI model, the advertisement media file based on the advertisement message and the context parameters.

The selected advertisement media file may include a text message generated based on the context parameters and pronounced by an artificial voice. The artificial voice can be generated, by the AI model, from a voice of a person pronouncing the advertisement message. Alternatively, the artificial voice can be generated, by the AI model, from a voice of a host of a podcast media file being played back by the application program running on the user device.

The context parameters may include a current location associated with the user device and current time and weather conditions associated with the current location of the user device. The selected advertisement media file may include a message concerning at least one of the following: the current location, the current time, and the weather conditions.

The context parameters may include a name and a type of the application program running the user device. The selected advertisement media file may include a message concerning the name and the type of the application program.

The context parameters may include metadata of a music record being played back by the application program on the user device. The selected advertisement media file may include a message concerning the metadata of the music record. The metadata of the music record may include one or more of the following: a genre of the music record, a name of a musical group that created the music record, a name of a talent singing in the music record, and so forth.

The context parameters may include the nearest address of a promoted service provider or store. The selected advertisement media file may include a message concerning the nearest address.

The context parameters may include a type of activity of a user of the user device. The selected advertisement media file may include a message concerning an activity of the user.

According to another example embodiment, a platform for providing environmental and context-based customized advertisement messages is provided. The platform can be in communication with an application server. The application server can be in communication with an application program running on a user device. The platform may include a processor and a memory storing instructions that, when executed by the processor, configure the platform to perform the above-mentioned method for providing environmental and context-based customized advertisement messages.

According to yet another aspect of the disclosure, a non-transitory processor-readable medium, which stores processor-readable instructions, is provided. When the processor-readable instructions are executed by a processor, they cause the processor to implement the above-mentioned method for providing environmental and context-based customized advertisement messages.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The technology described herein is concerned with systems and methods for providing environmental and context-based customized advertisement messages. Some embodiments of the present technology may facilitate providing customized advertisement messages to application programs running on user devices. The advertisement messages can be customized based on current environmental and context parameters (collectively referred herein to as context parameters) associated with the application programs and the user devices. The customized advertisement messages may be provided to the user devices and played back to users.

The system may include an advertisement provider platform in communication with an application server. The application server may be associated with application programs running on user devices associated with users. The application server may be configured to collect, via an application program running on the user device, context parameters associated with the application program, the user device, the user, and so forth.

The application server and/or the advertisement provider platform may be in communication with a plurality of service providers. The service providers may request the application server and/or the advertisement provider platform to provide advertisement offers to users of the application programs. The application server may be configured to send a request for advertisement to the advertisement provider platform. The application server may send the collected context parameters together with the request for advertisement.

The advertisement provider platform may have a plurality of advertisement media files in a database. The advertisement provider platform may analyze the request for advertisement and the context parameters and select one of the advertisement media files based on the analysis.

Each of the advertisement media files may include an advertisement message and one or more context parts. The advertisement message may include an advertisement offer provided by a service provider or generated by the advertisement provider platform according to parameters requested by the service provider. In an example embodiment, the advertisement message may include an audio file. The audio file may include the voice of a person pronouncing text of the advertisement offer. The advertisement message may remain unchanged for all advertisement media files in the database. In some embodiments, the advertisement message may include a video file. The audio track of the video file may include the voice of the person pronouncing text of the advertisement offer.

Each of the context parts may include a customized message generated by the advertisement provider platform. The advertisement provider platform may generate the context part based on the context parameters received from the application server. Specifically, the context part may include a text message generated by the advertisement provider platform based on the context parameters and pronounced by an artificial voice. The advertisement provider platform may generate the artificial voice using an AI model. The AI model may analyze the advertisement message, extract voice characteristics from the advertisement message, and generate the artificial voice based on the extracted voice characteristics. Therefore, the artificial voice pronouncing the context part may be substantially identical to the voice of the person pronouncing the text of the advertisement message. The context parts can be added to the beginning of the advertisement message, within the advertisement message, and at the end of the advertisement message in order to obtain the advertisement media file. In those embodiments where the advertisement message includes a video file, the context parts can be added to the beginning of an audio track of the video file, within the audio track of the video file, and at the end of the audio track of the video file in order to generate the advertisement media file.

The advertisement provider platform may preliminarily receive a plurality of possible context parameters before the interaction of the user with the application program. The advertisement provider platform may pre-generate a plurality of context parts based on various combinations of the context parameters. Upon generating the plurality of context parts, the advertisement provider platform may generate a plurality of advertisement media file by combining one of the context parts and the advertisement message to obtain an advertisement media file.

The advertisement provider platform may provide the selected advertisement media file to the application server. The application server may transmit the received advertisement media file to the user device. Upon receipt of the advertisement media file by the user device, the application program running on the user device may play back the advertisement media file to a user.

In another example embodiment, the advertisement provider platform may receive context parameters at the time of interaction of the user with the application program. In this embodiment, the advertisement provider platform may generate the context part based on the context parameters on the fly (that is at the time of interaction), combine the context part with the advertisement message into an advertisement media file, and provide the advertisement media file to the application server. The application server may provide the advertisement media file to the application program to be played back to the user while the user is interacting with the application program.

As the context part of the advertisement media file is generated based on the context parameters collected by the application server in association with the user, the advertisement media file selected by the advertisement provider platform for providing to the user is customized based on the context parameters associated with the user. Thus, the context part may be used to add context relevant to the user to the pre-recorded advertisement message. Therefore, the selected advertisement media file may be more relevant to the user as compared to pre-recorded advertisement messages identical for all users, which are usually sent by conventional systems for delivering advertisements. Additionally, because the advertisement media file is customized based on the context related to the user and environmental parameters of the user, the advertisement media file may be more attention-grabbing and more appealing for the user.

Additionally, current privacy policies and user visibility requirements often restrict or prohibit collection of personal user data by systems for delivering advertisements. This creates obstacles for making the advertisements more relevant to the user. The advertisement provider platform of the present disclosure uses data related to the context related to the user (such as a location, time, a type of a media content currently consumed by the user, a type of user activity in the application program, weather, an application type, and the like) rather than personal data related to the user.

Figure 1:
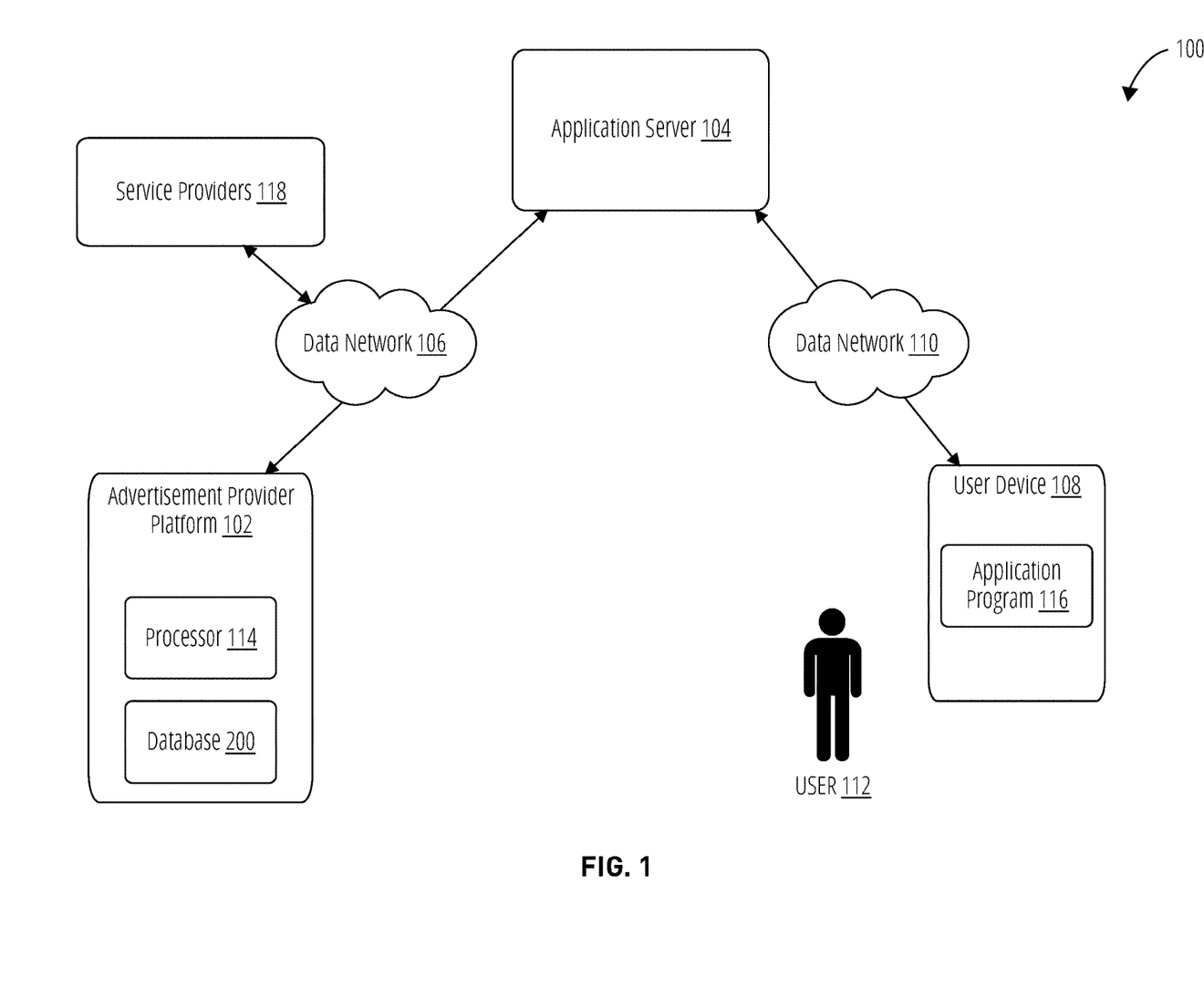
FIG. 1 is a block diagram showing an example environment, in which a system and a method for providing environmental and context-based customized advertisement messages can be implemented.

Referring now to the drawings, FIG. 1 shows an example environment 100, in which a system and a method for providing environmental and context-based customized advertisement messages can be implemented. The environment 100 may include an advertisement provider platform 102, an application server 104 in communication with the advertisement provider platform 102 via a data network 106, a user device 108 in communication with the application server 104 via a data network 110, and a user 112 associated with the user device 108. The advertisement provider platform 102 may include a processor 114 and a database 200. The user device 108 may include an application program 116 running on the user device 108.

The user device 108 can include radio frequency receivers, transmitters, and transceivers, wired and/or wireless telecommunications and/or networking devices, amplifiers, audio and/or video players, encoders, decoders, speakers, inputs, outputs, storage devices, and user input devices. The user device 108 can be configured to receive a media stream and play the media stream to the user 112 using an output device (for example, speakers and earphones). The user device 108 can be configured to sense ambient acoustic sound using, for example, one or more microphones. The user device 108 may include, but is not limited to, a smartphone, a laptop, a desktop computer, a tablet computer, a phablet, a personal digital assistant, a media player, a mobile telephone, a smart television set, in-vehicle infotainment, a smart home device, a personal computing device, and the like.

In some embodiments, the user device 108 may include a communication unit to receive media streams via one or more media stream players. In certain embodiments, the media stream can be delivered using the data network 110. The advertisement provider platform 102 may communicate with the application server 104 via the data network 106. The data network 106 and the data network 110 can refer to any wired, wireless, or optical networks including, for example, the Internet, intranet, a Local Area Network (LAN), a Personal Area Network (PAN), Wide Area Network (WAN), a Virtual Private Network (VPN), a Wi-Fi® network, cellular phone networks (e.g., a Global System for Mobile (GSM) communications network, a packet switching communications network, a circuit switching communications network), Bluetooth™ radio, an Ethernet network, an IEEE 802.11-based radio frequency network, a Frame Relay network, an Internet Protocol (IP) communications network, or any other data communication network utilizing physical layers, link layer capability, or network layers to carry data packets, or any combinations of the above-listed data networks. In some embodiments, any of the data network 106 and the data network 110 may include a corporate network, a data center network, a service provider network, a mobile operator network, or any combinations thereof.

In some embodiments, the application server 104 may be implemented as a server or a cloud-based computing resource associated with one or more application programs 116 running on the user device 108. The application server 104 may include hardware and software available at a remote location and accessible over the data network 110 and the data network 106. The application server 104 can be dynamically re-allocated based on demand. The application server 104 may include one or more server farms/clusters including a collection of computer servers that can be co-located with network switches and/or routers.

The application server 104 may use a plurality of application programs 116 running on user devices 108 for providing advertisement offers to users 112. In some embodiments, the application server 104 may be in communication with a plurality of service providers 118. The service providers 118 may request the application server 104 to provide advertisement offers to the users 112 of the application programs 116. The advertisement offers may be provided in a form of advertisement media files played back on the user devices 108. The advertisement offers may include suggestions for ordering products and/or services, visiting a shop, visiting a website, and so forth.

In some embodiments, the service providers 118 may communicate not with the application server 104, but with the advertisement provider platform 102. The service providers 118 may provide advertisement offers to the advertisement provider platform 102. The advertisement offers can be further provided to users via various application programs. In this embodiment, the application server 104 may be configured to communicate with the advertisement provider platform 102 and send a request for advertisement. In response to the request for advertisement, the advertisement provider platform 102 may provide, to the application server 104, an advertisement media file generated based on an advertisement offer received by the advertisement provider platform 102 from the service providers 118.

The user device 108 may have the application program 116 running on the user device 108. The application program 116 may be configured to communicate with the application server 104, receive a media stream from the application server 104, and play back the media stream to the user 112 on the user device 108. In an example embodiment, the application program 116 may be associated with music-, television-, podcast-, or video-streaming services. Example application programs 116 may include Spotify®, Apple Music®, Amazon Music®, Amazon Prime Video®, YouTube Music®, YouTube TV®, Pandora®, and the like. The application program 116 may be further configured to track and collect context parameters associated with the user 112, the user device 108, the application program 116, and so forth. The application program 116 may provide the collected context parameters to the application server 104.

The application server 104 may be configured to receive the context parameters from the application program 116 and provide the context parameters to the advertisement provider platform 102. The advertisement provider platform 102 may select, based on the context parameters, an advertisement media file for the user 112. The advertisement provider platform 102 can send the advertisement media file to the application server 104, which in turn may send the advertisement media file to the user device 108. The application program 116 may play the advertisement media file to the user 112 via one or more output devices of the user device 108.

The application server 104 may be associated with a plurality of application programs 116 of different types and delivering different types of content to the user. The advertisement provider platform may customize the advertisement offer by generating advertisement media files that are relevant to the user 112, user environment, user activity in the application programs, and other parameters related to the user 112.

Figure 2:
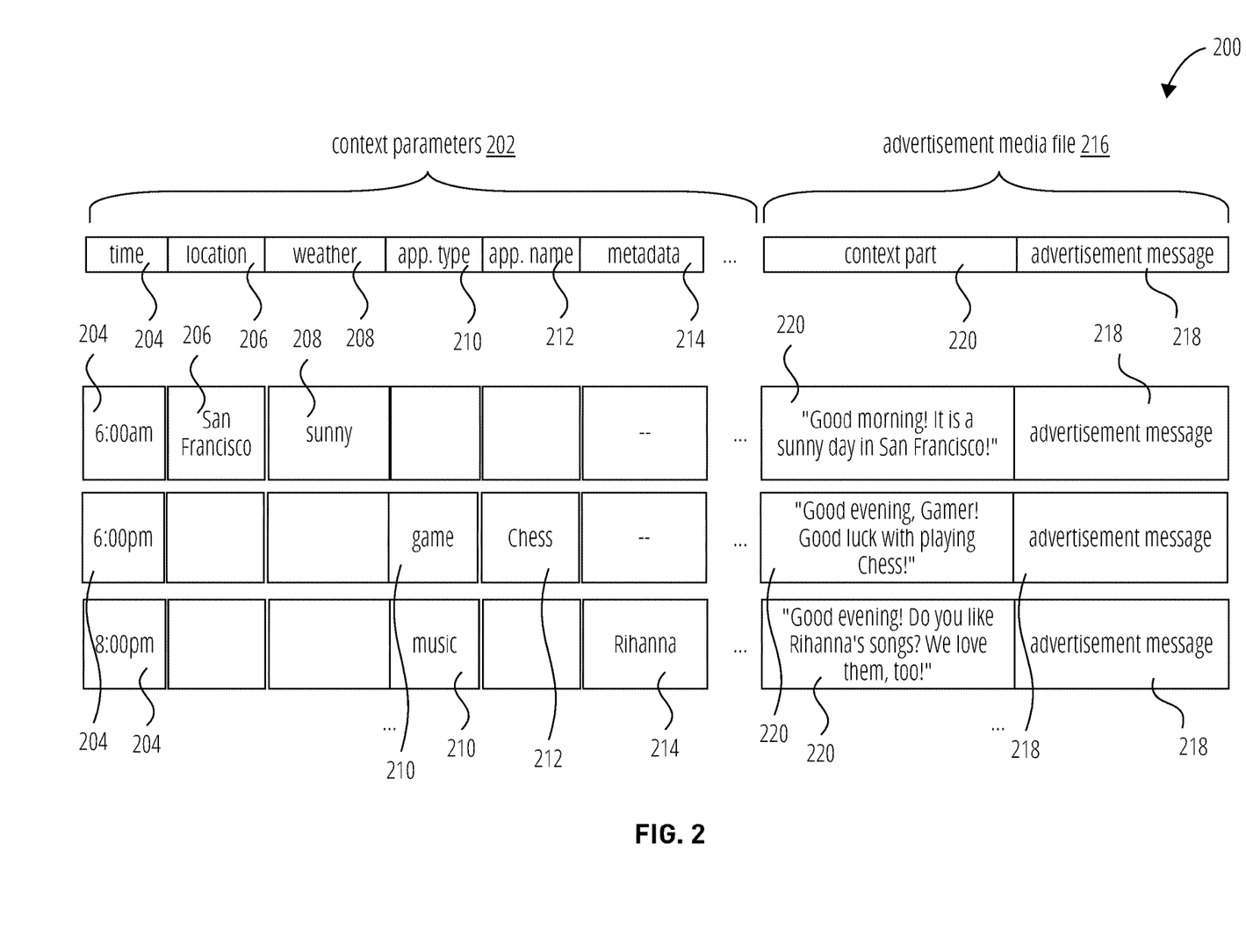
FIG. 2 is a scheme showing an example database storing advertisement media files, in accordance with some example embodiments.

FIG. 2 is a scheme showing an example database 200 storing advertisement media files, in accordance with some example embodiments. The database 200 may store advertisement media files 216 and a plurality of context parameters 202. The context parameters 202 may include parameters collected by an application server via an application program running on a user device. The context parameters 202 may include parameters associated with the user device (e.g., a physical environment in which the user 112 is currently present, a virtual environment in which the user is currently present, and so forth), parameters associated with a user of the user device, parameters associated with the application program running on the user device, and other parameters relevant to the user. For example, the context parameters 202 may include time 204, a location 206 of the user, weather 208, an application type 210, an application name 212, metadata 214, and so forth. The time 204 may include current time at which the user 112 interacts with the application program running on the user device. The time 204 may include a specific hour, e.g., 6:00 a.m., 6:00 p.m., 8:00 p.m., and so forth. The time 204 may further include a specific part of the day, e.g., morning, afternoon, evening, night, and the like.

The application server 104 may constantly collect context parameters 202 from the application program 116. Therefore, the application server 104 may know that the user 112 interacts with the application program in a current moment of time. The interaction may include listening to the music or podcasts, watching TV, sports, or videos, playing a game, and the like. In an example embodiment, the application server may send a request for advertisement to the advertisement provider platform 102 at the time 204 of interaction of the user 112 with the application program 116. Upon receipt of the request for advertisement, the advertisement provider platform 102 may consider the time of receipt of the request for advertisement to be the time 204 of interaction of the user with the application program 116.

In an example embodiment, the application server 104 may determine the time 204 based on a time zone in which the user is currently present. The time zone may be determined based on the location 206 of the user device 108. In this embodiment, the time 204 may be provided to the advertisement provider platform 102 by the application server 104 in the context parameters 202.

The location 206 of the user may be determined by the user device, e.g., by using a Global Positioning System (GPS) of the user device 108. The application program 116 may be authorized to use the services of the user device 108 to determine parameters of the user device 108, such as the location 206. The location 206 may include a city (e.g., San Francisco, New York, Washington, and so forth), a state (e.g., California, Colorado, Texas), a country (e.g., the USA), a place of interest (e.g., Central Park, Times Square, Lake Victoria), and so forth.

The weather 208 may include weather conditions at the location 206 of the user. The weather 208 may include, e.g., sunny, rainy, snowy, frosty, hot, cloudy, temperature, and the like. In an example embodiment, the application server 104 may collect the weather conditions from third-party services for the location 206 of the user 112. In another example embodiment, the application program 116 may be authorized to access weather services on the user device 108 and collect the weather conditions from the weather services of the user device 108. The application program 116 may provide the weather conditions to the application server 104.

The application type 210 may include a type of the application program running on the user device. The application type 210 may include music, video, TV, sports, podcast, game, audio books, radio, news, and the like.

The application name 212 may include a name of the application program running on the user device, e.g., Chess game, Spotify®, Apple Music®, Amazon Music®, Amazon Prime Video®, YouTube Music®, YouTube TV®, Pandora®, and the like.

The metadata 214 may be associated with a content provided to the user by the application program. The metadata 214 may include a name of a music record (e.g., Lift Me Up®, a name of a singer (e.g., Rihanna), a name of a movie (e.g., Avatar®), a name of a performer in a podcast, and the like.

In an example embodiment, the context parameters 202 may further include a model of a user device (e.g., iPhone®), a type of an operating system (e.g., iOS®, Android®), and so forth.

In some example embodiment, context parameters 202 may further include other parameters related to the user, such as an age of the user, a gender of the user, a native language of the user, historical data related to the user interaction with the user device, historical data related to the media content consumed by the user, and so forth. In further example embodiments, the context parameters 202 may include the current activity of the user, for example playing a game, watching a movie, listening to an audio podcast, and so forth. In other embodiments, the context parameters 202 may include real-time data concerning offers by service providers 118 (shown in FIG. 1).

The advertisement provider platform 102 may preliminarily receive a plurality of possible context parameters 202, i.e., before the interaction of the user with the application program. The advertisement provider platform 102 may pre-generate a plurality of context parts 220 based on various combinations of the context parameters 202. Upon generating the plurality of context parts 220, the advertisement provider platform 102 may generate a plurality of advertisement media file 216 by combining one of the context parts 220 and the advertisement message 218 to obtain an advertisement media file 216. The advertisement message 218 may store the plurality of advertisement media files 216 in the database 200. Each of the advertisement media file 216 may include two parts. The first part is an advertisement message 218 and the second part is a context part 220.

The advertisement message 218 of the advertisement media file 216 may include an audio file with the voice of a person pronouncing the text of the advertisement message 218. The same advertisement message 218 may be used for the plurality of advertisement media files 216. In an example embodiment, the advertisement message 218 may include the audio file of a predetermined length (e.g., 15 seconds, 30 seconds, 1 minute, and the like) in which a person pronounces an advertisement offer. Example advertisement offers pronounced by the voice of the person in the advertisement message 218 may be "We invite you to visit Macy's®! We have a great sale this week!" In an example embodiment, the advertisement message 218 may be provided by a service provider.

The context part 220 of the advertisement media file 216 may include an audio file generated by the advertisement provider platform based on context parameters 202 according to predetermined criteria. Any combination of the context parameters 202 relevant to the user may be used for generating the context part 220.

In an example embodiment, the context parameters 202 collected via the application program 116 by the application server 104 may include time 204 (6:00 a.m.), location 206 (San Francisco), and weather 208 (sunny). Based on the context parameters 202, the advertisement provider platform may generate the context part 220. The context part 220 may be generated in the following form: "Good morning! It is a sunny day in San Francisco!", where the portion "Good morning!" is generated based on the time 204 (6:00 a.m.), the portion "It is a sunny day" is generated based on the weather 208 (sunny), and the portion "in San Francisco!" is generated based on the location 206 (San Francisco). The advertisement provider platform 102 may combine the generated context part 220 with the advertisement message 218 into the advertisement media file 216. The combined advertisement media file 216 may be as follows: "Good morning! It is a sunny day in San Francisco! We invite you to visit Macy's®! We have a great sale this week!"

In another example embodiment, the context parameters 202 collected via the application program by the application server may include time 204 (6:00 p.m.), the application type 210 (game), and the application name 212 (Chess). Based on the context parameters 202, the advertisement provider platform 102 may generate the context part 220. The context part 220 may be generated in the following form: "Good evening, Gamer! Good luck with playing Chess!", where the portion "Good evening" is generated based on the time 204 (6:00 p.m.), the portion "Gamer" is generated based on the application type 210 (game), and the portion "Good luck with playing Chess!" is generated based on the application name 212 (Chess). The advertisement provider platform 102 may combine the generated context part 220 with the advertisement message 218 into the advertisement media file 216. The combined advertisement media file 216 may be as follows: "Good evening, Gamer! Good luck with playing Chess! We invite you to visit Macy's®! We have a great sale this week!"

In another example embodiment, the context parameters 202 collected via the application program by the application server may include time 204 (8:00 p.m.), the application type 210 (music), and the metadata 214 (the singer's name "Rihanna"). Based on the context parameters 202, the advertisement provider platform 102 may generate the context part 220. The context part 220 may be generated in the following form: "Good evening! Do you like Rihanna's songs? We love them, too!," where the portion "Good evening" is generated based on the time 204 (8:00 p.m.), the portion "songs . . . We love them, too!" is generated based on the application type 210 (music), and the portion "Do you like Rihanna's . . . ?" is generated based on the metadata 214 (the singer's name "Rihanna"). The advertisement provider platform 102 may combine the generated context part 220 with the advertisement message 218 into the advertisement media file 216. The combined advertisement media file 216 may be as follows: "Good evening! Do you like Rihanna's songs? We love them, too! We invite you to visit Macy's®! We have a great sale this week!"

In an example embodiment, the context part 220 may be placed in the advertisement media file 216 before the advertisement message 218. In other example embodiment, the context part 220 may be placed in the advertisement media file 216 after the advertisement message 218. In another example embodiment, the context part 220 may be generated in a form of several portions, some of which may be placed before the advertisement message 218 and some of which may be placed after the advertisement message 218 in the advertisement media file 216. In some example embodiments, the advertisement message 218 may be divided into the several portions and one or more portions of the context part 220 may be placed between the portions of the advertisement message 218.

In some example embodiments, the context part 220 may be shorter in length than the advertisement message 218, longer in length than the advertisement message 218, or the context part 220 and the advertisement message 218 may have the same length.

The number of advertisement media file 216 generated based on the context parameters 202 may be extremely large. For example, the database 200 may store thousands of advertisement media files 216 associated with an advertisement campaign requested by a service provider. Accordingly, the database 200 may store thousands of versions of the advertisements for the advertising campaign. Upon receiving the request for advertisement, the advertisement provider platform 102 selects one of the plurality of advertisement media files 216 from the database 200 based on the context parameters 202 received together with the request for advertisement or generated based on the request for advertisement.

Figure 3:
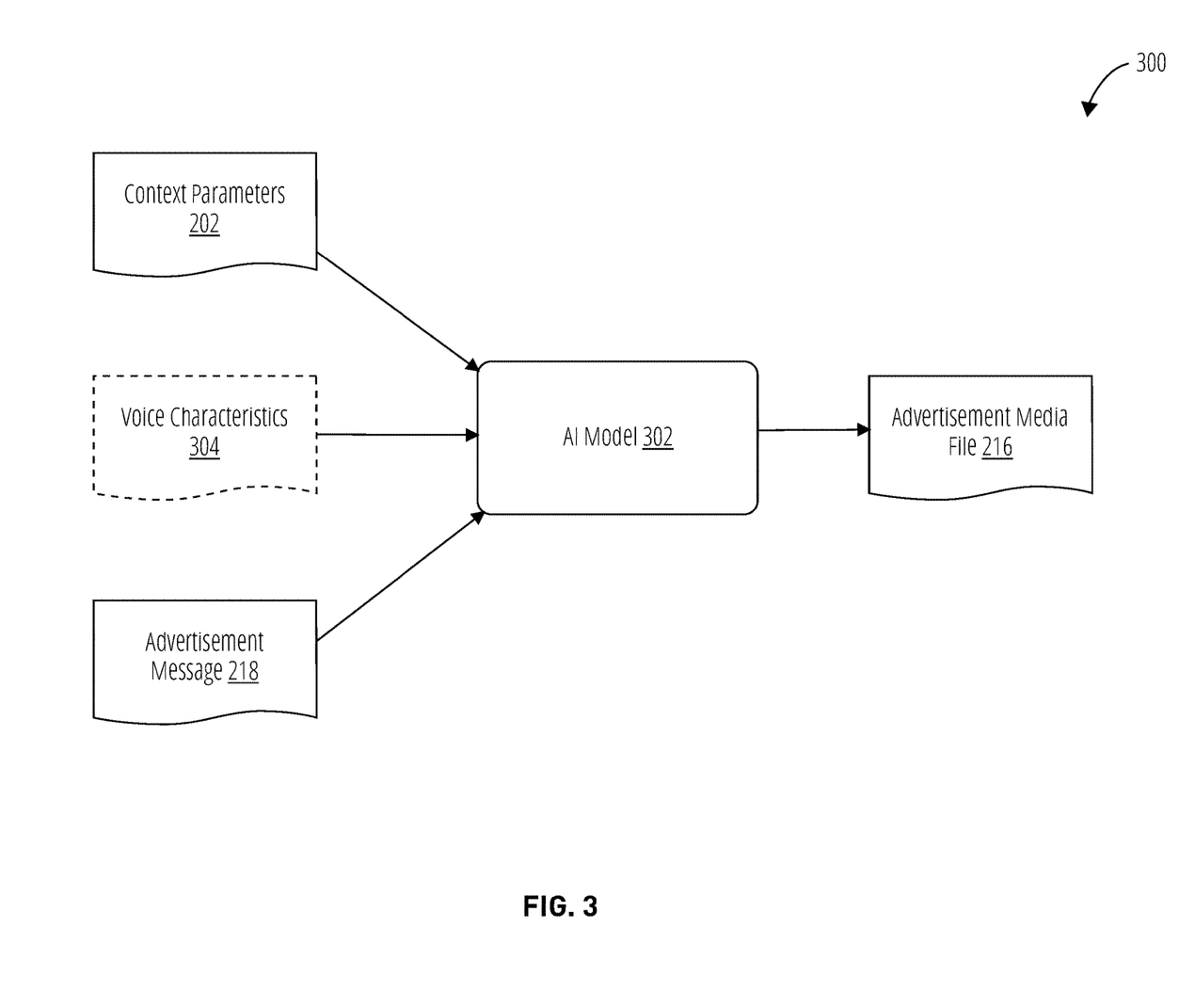
FIG. 3 is a block diagram showing functionality of an example AI model for generating customized advertisement media files, in accordance with some example embodiments.

FIG. 3 is a block diagram 300 showing functionality of an example AI model for generating customized advertisement media files 216, in accordance with some example embodiments. The advertisement provider platform 102 may use an AI model 302 for generating customized advertisement media files 216. Specifically, the AI model 302 may be used for generating the context parts 220 of the advertisement media files 216. The AI model 302 may have a number of functionalities, including text generation, voice cloning, and generation of audio files based on the generated text using the cloned voice.

Text generation. The advertisement provider platform may provide the context parameters 202 and the advertisement message 218 to the AI model 302. The AI model 302 may analyze the context parameters 202. Based on the context parameters 202, the AI model 302 may generate text of the context part of the advertisement media file. The AI model 302 may generate the text based on predetermined rules and the context parameters 202. The AI model 302 may be configured to generate all possible versions of the text based on the context parameters 202. As a results, a large number (e.g., thousands) of versions of the text may be generated by the AI model 302.

In some example embodiment, the AI model 302 may generate the text of the context part 220 using a lookup table. The lookup table may have predetermined fields. The AI model 302 may insert context parameters into the predetermined fields of the lookup table based on predetermined criteria. Upon inserting the context parameters into the predetermined fields of the lookup table, the following example text may be generated: "Good 'time'! It is a 'weather' in 'location'!", "Good 'time', 'application type' user! Good luck with playing 'application name'!", "Good 'time'! Do you like 'metadata' 'application type'? We love them, too!"

Voice cloning. To perform voice cloning, the AI model 302 may extract voice characteristics 304 from the advertisement message 218. The AI model 302 may use the extracted voice characteristics 304 to generate an artificial voice. More specifically, the AI model 302 may include an acoustic model, which may be trained to duplicate the voice of the advertisement message 218 based on the voice characteristics 304 extracted from the advertisement message 218.

Alternatively, the artificial voice can be generated, by the AI model, from a voice of a host of a podcast media file being played back by the application program running on the user device. Therefore, the advertisement provider platform may replicate the voice of the host of the podcast media and deliver advertisement media files in podcasting using the cloned voice of the host.

Generation of audio files. Upon learning how to generate the artificial voice identical to the voice in the advertisement message 218, the AI model 302 may generate the context part by pronouncing the text of the context part using the artificial voice. Therefore, as the artificial voice used for pronouncing the context part is generated based on the voice characteristics 304 extracted from the advertisement message 218, both portions of the combined advertisement media file 216 are pronounced by the same voice. The context part may be generated in the form of an audio file.

Generation of video files. If the advertisement message 218 includes a video file, the AI model 302 may extract voice characteristics 304 from an audio track of advertisement message 218. Upon generation of the context part using the voice characteristics 304, AI model 302 may add the context part to the audio track of the advertisement message 218, thereby generating the advertisement media file 216 in a video format.

In an example embodiment, voice characteristics 304 may be optionally provided to the AI model 302. The voice characteristics 304 may include the voice of a host in video currently watched by the user, the voice of a host in an audio podcast currently listened to by the user, and the like. In an example embodiment, the voice characteristics 304 may be provided by the application server. In another example embodiment, the voice characteristics 304 may be retrieved from the database based on predetermined criteria and the analysis of the context parameters 202. If the voice characteristics 304 are provided to the AI model 302, the AI model 302 does not need to extract the voice characteristics from the advertisement message 218. Instead, the AI model 302 directly uses the voice characteristics 304 for generating the artificial voice to be used for pronouncing the context part. In those embodiments where the voice characteristics 304 are associated with the host of video or audio podcast currently being listened to by the user, the AI model 302 may change the voice of the person pronouncing text in the advertisement message 218 to the voice of the host. The AI model 302 may apply, based on the voice characteristics 304, both the voice and the speech style of the host to text pronounced in the advertisement message 218. In these embodiments, the entire advertisement media file 216 can sound as if being pronounced by the host.

In view of the large number of combinations of the context parameters 202, the number of the generated versions of text may be also large. Accordingly, the number audio files of the context part generated based on the versions of the text may be large too. Voicing and recording such a large number of audio files manually using the voice of a real person would be extremely labor-intensive and time-consuming. In view of this, manual voicing and recording of audio files of the context parts may be economically inefficient. The AI model 302 used in the advertisement provider platform of the present disclosure may automatically generate a large number of text portions and then automatically generate a large number of audio files of the context part based on the generated text portions and using the cloned voice.

In an example embodiment, the AI model 302 may be trained to analyze the advertisement message 218 and to generate the context part in line with a style, emotions, tone, and other characteristics of the advertisement message 218 to make the resulting advertisement media file 216 sound more natural.

Upon generating the context part by the AI model 302, the advertisement provider platform may combine the generated audio file of the context part and the audio file of the advertisement message 218 into the advertisement media file 216. In some embodiments, the advertisement message 218 may have a background sound, such as music, special effects, and the like. When generating the advertisement media file 216, the advertisement provider platform may propagate the background sound of the advertisement message 218 to the context part.

In an example embodiment, the advertisement message 218 may be provided in a form of a text message. The context parameters 202 provided to the AI model 302 may include the voice characteristics 304. For example, the advertisement message 218 and the context part may need to be pronounced using the voice of a known person or the predetermined voice. The AI model 302 may generate the voice based on the voice characteristics 304 and use the voice to generate the audio files of both the advertisement message 218 and the context part.

In an example embodiment, the AI model 302 may generate the context part in the native language of the user. The native language may be determined based on the context parameters 202.

In some example embodiments, AI model 302 may be used by advertisement provider platform 102 (shown in FIG. 1) to generate the advertisement media files in real time. For example, AI model 302 may receive, in real time, context parameters 202 that include real-time data provided by service providers 118 (shown in FIG. 1). The real-time data can be provided by the service providers 118 to the application server 104 (shown in FIG. 1) and application server 104 can provide context parameters 202 including the real-time data to the advertisement provider platform 102. The real-time data may include real-time prices and discounts on goods and services of the service providers 118. If service providers 118 is a gambling platform, context parameters 202 may include current odds that can be changed during a specific event, for example, during a sporting event, a car race, a horse race, and so forth.

The advertisement media file 216 generated by AI model 302 may include a message concerning the real-time data provided by the service providers 118. For example, the message may include information concerning current odds of the gambling platform. Once generated, advertisement media file 216 can be provided by advertisement provider platform 102 to application server 104. The application server 104 may provide the advertisement media file 216, including the real-time data, to application program 116 running on user device 108. The application program 116 can then play back the advertisement media file 216 to user 112, thereby providing user 112 with the latest real-time data from service providers 118.

Figure 4:
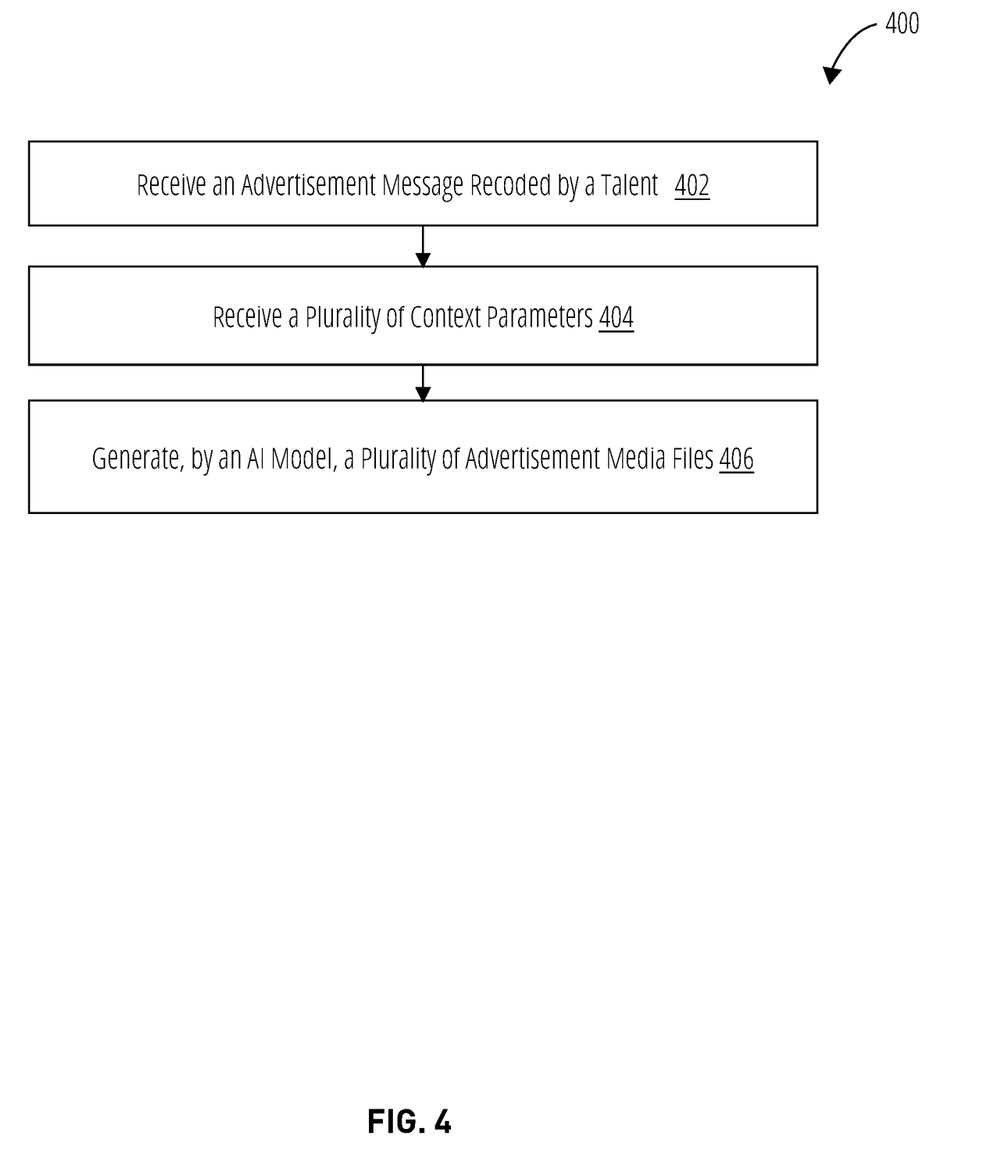
FIG. 4 illustrates a method for generating customized advertisement media files, in accordance with some example embodiments.

FIG. 4 is a flow chart of a method 400 for generating customized advertisement media files, according to an example embodiment. In some embodiments, the operations may be combined, performed in parallel, or performed in a different order. The method 400 may also include additional or fewer operations than those illustrated. The method 400 may be performed by processing logic that may comprise hardware (e.g., decision making logic, dedicated logic, programmable logic, and microcode), software (such as software run on a general-purpose computer system or a dedicated machine), or a combination of both.

The method 400 may commence with receiving an advertisement message recorded by a talent in block 402. The advertisement message may include an audio file with the voice of the talent. The talent may include a person that pronounces the text in the audio file.

The method 400 may further include receiving a plurality of context parameters in block 404. The context parameters may include time, a location of a user, weather, an application type, an application name, metadata, and so forth. The context parameters may be collected by the application server via the application program running on the user device. In an example embodiment, the context parameters may be generated automatically by the advertisement provider platform based on the request for advertisement and predetermined criteria. In another example embodiment, the context parameters may be edited manually by the users. For example, a service provider that requests the advertisement provider platform to provide advertisement offers to the users may select time when the advertisement offers are to be provided to the users, cities in which the advertisement offers are to be provided to the users, and types of applications in which the advertisement offers are to be provided to the users.

The method 400 may further include generating, by an AI model, a plurality of advertisement media files in block 406. The generation of the plurality of advertisement media files commences with generation of the plurality of context parts. Each of the context parts is generated based on one or more context parameters. The AI model uses a plurality of different combinations of the context parameters (e.g., a first location; a first time, and a first application type; a second location, a first time, and first metadata; a second time, a second application type, and a first application name; and so forth) to generate the plurality of context parts.

The AI model may generate an advertisement media file by combining one of the generated context parts with the advertisement message. Therefore, upon combining each of the generated context parts with the advertisement message, the plurality of advertisement media files is generated.

Figure 5:
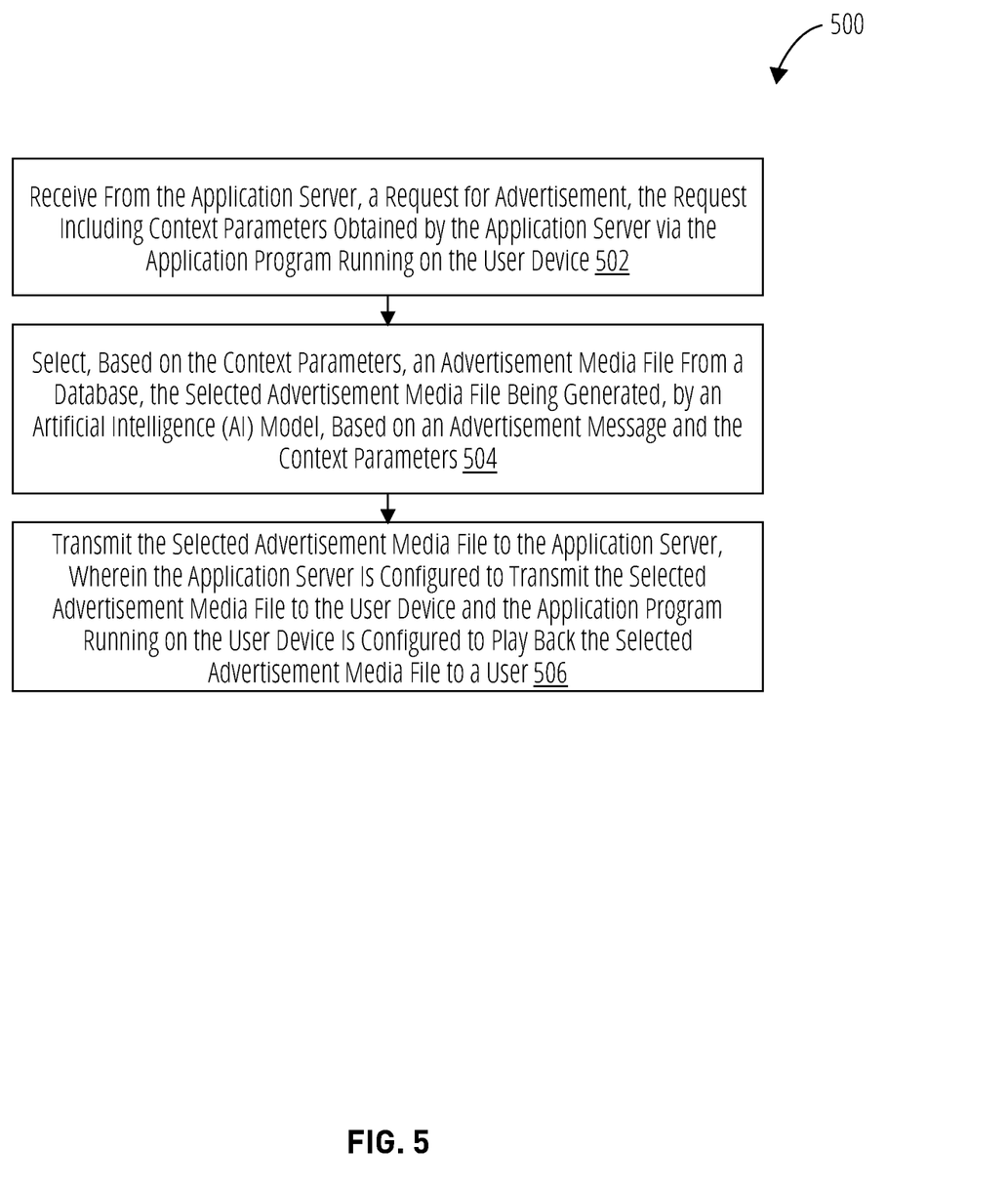
FIG. 5 illustrates a method for providing environmental and context-based customized advertisement messages, in accordance with some example embodiments.

FIG. 5 is a flow chart of a method 500 for providing environmental and context-based customized advertisement messages, according to an example embodiment. In some embodiments, the operations may be combined, performed in parallel, or performed in a different order. The method 500 may also include additional or fewer operations than those illustrated. The method 500 may be performed by processing logic that may comprise hardware (e.g., decision making logic, dedicated logic, programmable logic, and microcode), software (such as software run on a general-purpose computer system or a dedicated machine), or a combination of both.

The method 500 may be performed by an advertisement provider platform. The advertisement provider platform may include a processor and a database. The advertisement provider platform may be in communication with an application server. The application server may be in communication with an application program running on a user device.

The method 500 may commence in block 502 with receiving, from the application server, a request for advertisement. The request for advertisement may include context parameters obtained by the application server via the application program running on the user device.

In block 504, the method 500 may continue with selecting, based on the context parameters, an advertisement media file from the database. The selected advertisement media file may be generated by an AI model based on an advertisement message and the context parameters. The selected advertisement media file may include a text message generated based on the context parameters and pronounced by an artificial voice. In an example embodiment, the artificial voice may be generated, by the AI model, from the voice of a person pronouncing the advertisement message. In another example embodiment, the artificial voice may be generated, by the AI model, from a voice of a host of a podcast media file being played back by the application program running on the user device.

In an example embodiment, the context parameters may include a current location associated with the user device and current time and weather conditions associated with the current location of the user device. The selected advertisement media file generated by the AI model may include a message concerning at least one of the following: the current location, the current time, and the weather conditions.

In another example embodiment, the context parameters may include a name and a type of the application program running the user device. The selected advertisement media file generated by the AI model may include a message concerning the name and the type of the application program.

In another example embodiment, the context parameters may include the nearest address of a promoted service provider or store. The selected advertisement media file may include a message concerning the nearest address.

In yet another example embodiment, the context parameters may include a type of activity of a user of the user device. The type of activity may include listening to a podcast, playing a game, watching a movie, listening to an audiobook, and the like. The selected advertisement media file may include a message concerning the activity of the user.

In another example embodiment, the context parameters may include metadata of a music record played back by the application program on the user device. The selected advertisement media file generated by the AI model may include a message concerning the metadata of the music record. The metadata of the music record may include one or more of the following: a genre of the music record, a name of a musical group that created the music record, a name of a talent singing in the music record, and the like.

In an example embodiment, the database may include a plurality of advertisement media files pre-generated based on the same advertisement message and different sets of the context parameters.

In block 506, the method 500 may include transmitting the selected advertisement media file to the application server. The application server may be configured to transmit the selected advertisement media file to the user device. The application program running on the user device may be configured to play back the selected advertisement media file to a user.

In an example embodiment, the advertisement media file may be played back along with playing back the media content by the application program. For example, the advertisement media file may be overlaid over the media content currently provided to the user by the application program. In an example embodiment, the advertisement media file may be overlaid over a music record currently played by the application program such that the user hears both the music record and the advertisement media file. In another example embodiment, the advertisement media file may be overlaid over a video currently provided by the application program to the user such that the user hears both the sound present in the video and the advertisement media file. In another example embodiment, the media content currently provided to the user by the application program may be paused and the advertisement media file may be played back to the user. Upon playing back the advertisement media file, providing of the media content may be resumed.

In an example embodiment, the method 500 may further include determining that the database does not include a pre-generated advertisement media file matching the context parameters. In response to the determination, the advertisement provider platform may generate, using the AI model, the advertisement media file based on the advertisement message and the context parameters.

In an example embodiment, upon playing back the advertisement media file to the user, the application program may send a message to the application server notifying the application server that the advertisement media file has been played back. The application server may send the message to the advertisement provider platform to notify the advertisement provider platform that the advertisement media file has been played back.

Figure 6:
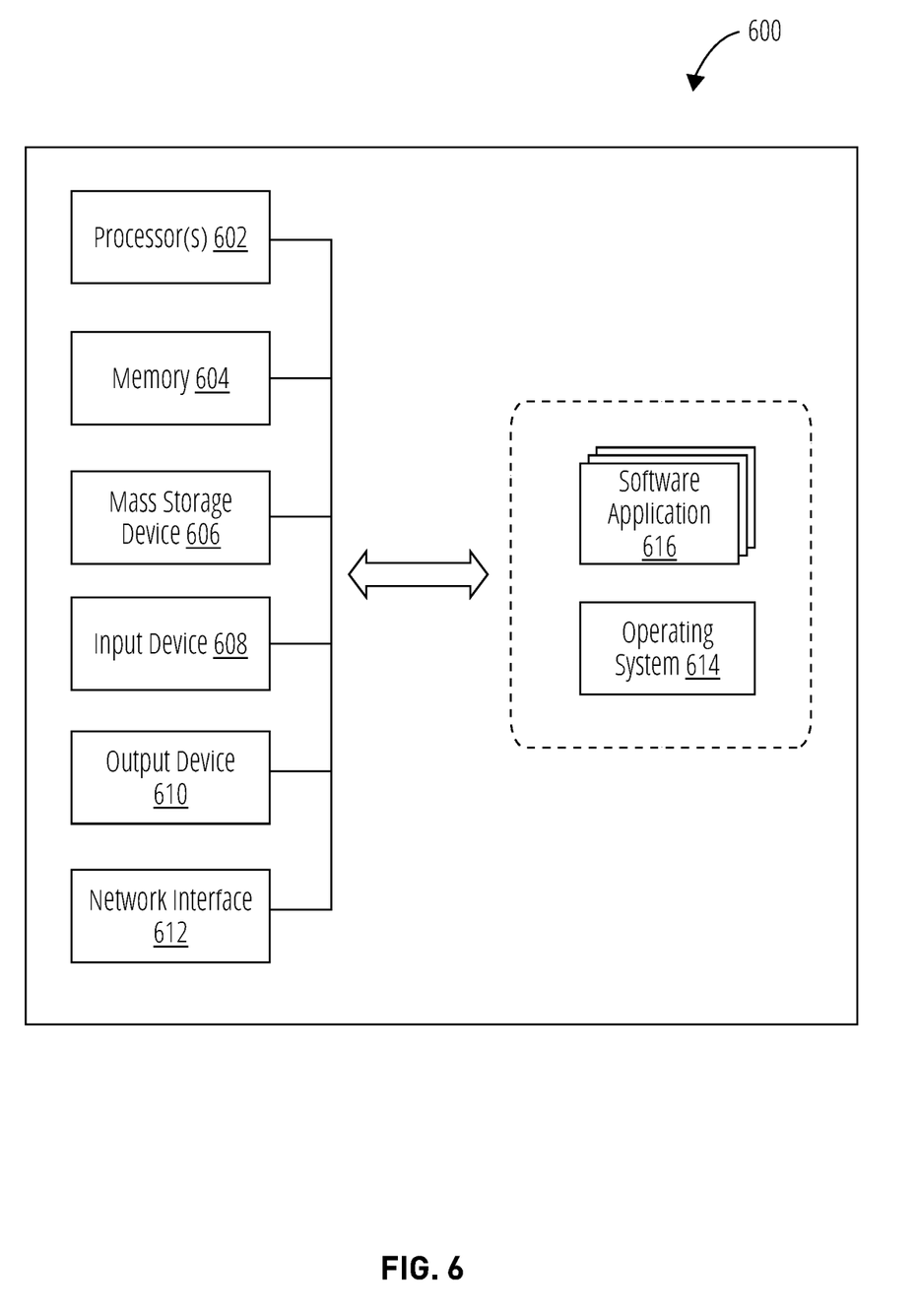
FIG. 6 is a high-level block diagram illustrating an example computer system, within which a set of instructions for causing a machine to perform any one or more of the methodologies discussed herein can be executed.

FIG. 6 is a high-level block diagram illustrating an example computer system 600, within which a set of instructions for causing a machine to perform any one or more of the methodologies discussed herein can be executed. The computer system 600 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 600 is an example of an advertisement provider platform 102, an application server 104, and a user device 108 shown in FIG. 1. Notably, FIG. 6 illustrates just one example of the computer system 600 and, in some embodiments, the computer system 600 may have fewer elements/modules than shown in FIG. 6 or more elements/modules than shown in FIG. 6.

The computer system 600 may include one or more processor(s) 602, a memory 604, one or more mass storage devices 606, one or more input devices 608, one or more output devices 610, and a network interface 612. The processor(s) 602 are, in some examples, configured to implement functionality and/or process instructions for execution within the computer system 600. For example, the processor(s) 602 may process instructions stored in the memory 604 and/or instructions stored on the mass storage devices 606. Such instructions may include components of an operating system 614 or software applications 616. The computer system 600 may also include one or more additional components not shown in FIG. 6, such as a body, a power supply, a power supply, a GPS receiver, and so forth.

The memory 604, according to one example, is configured to store information within the computer system 600 during operation. The memory 604, in some example embodiments, may refer to a non-transitory computer-readable storage medium or a computer-readable storage device. In some examples, the memory 604 is a temporary memory, meaning that a primary purpose of the memory 604 may not be long-term storage. The memory 604 may also refer to a volatile memory, meaning that the memory 604 does not maintain stored contents when the memory 604 is not receiving power. Examples of volatile memories include random access memories (RAM), dynamic random access memories (DRAM), static random access memories (SRAM), and other forms of volatile memories known in the art. In some examples, the memory 604 is used to store program instructions for execution by the processor(s) 602. The memory 604, in one example, is used by software (e.g., the operating system 614 or the software applications 616). Generally, the software applications 616 refer to software Applications suitable for implementing at least some operations of the methods for providing environmental and context-based customized advertisement messages as described herein.

The mass storage devices 606 may include one or more transitory or non-transitory computer-readable storage media and/or computer-readable storage devices. In some embodiments, the mass storage devices 606 may be configured to store greater amounts of information than the memory 604. The mass storage devices 606 may further be configured for long-term storage of information. In some examples, the mass storage devices 606 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 608, in some examples, may be configured to receive input from a user through tactile, audio, video, or biometric channels. Examples of the input devices 608 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 600, or components thereof.

The output devices 610, in some examples, may be configured to provide output to a user through visual or auditory channels. The output devices 610 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 610 may also include a touchscreen, a presence-sensitive display, or other input/output capable displays known in the art.

The network interface 612 of the computer system 600, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi Networks®, among others. The network interface 612 may be a network interface card, such as an Ethernet card, an optical transceiver, a radio frequency transceiver, or any other type of device that can send and receive information.

The operating system 614 may control one or more functionalities of the computer system 600 and/or components thereof. For example, the operating system 614 may interact with the software applications 616 and may facilitate one or more interactions between the software applications 616 and components of the computer system 600. As shown in FIG. 6, the operating system 614 may interact with or be otherwise coupled to the software applications 616 and components thereof. In some embodiments, the software applications 616 may be included in the operating system 614. In these and other examples, virtual modules, firmware, or software may be part of the software applications 616.

Thus, systems and methods for providing environmental and context-based customized advertisement messages have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method for providing environmental and context-based customized advertisement messages, the method being performed by an advertisement provider platform comprising a processor, the advertisement provider platform being in communication with an application server, the application server being in communication with an application program running on a user device, the method comprising:
   receiving, from the application server, a request for advertisement, the request including context parameters obtained by the application server via the application program running on the user device;
   selecting, based on the context parameters, an advertisement media file from a database, the selected advertisement media file being generated, by an Artificial Intelligence (AI) model, based on an advertisement message and the context parameters, wherein:
      the selected advertisement media file includes at least one context part including a text message generated based on the context parameters and pronounced by an artificial voice;
      the artificial voice is generated, by the AI model, from a voice of a host of a podcast media file being played back by the application program running on the user device; and
      the AI model is trained to:
         extract voice characteristics of the host from the podcast media file; and
         generate, based on the extracted voice characteristics, the at least one context part pronounced by the artificial voice; and
   transmitting the selected advertisement media file to the application server, wherein the application server is configured to transmit the selected advertisement media file to the user device and the application program running on the user device is configured to play back the selected advertisement media file to a user.

2. The method of claim 1, wherein the database includes a plurality of advertisement media files pre-generated based on a same advertisement message and different sets of the context parameters.

3. The method of claim 1, further comprising:
   determining that the database does not include a pre-generated advertisement media file matching the context parameters; and
   in response to the determination, generating, using the AI model, the advertisement media file based on the advertisement message and the context parameters.

4. The method of claim 1, wherein the artificial voice is generated, by the AI model, from a voice of a person pronouncing the advertisement message.

5. The method of claim 1, wherein:
   the context parameters include a current location associated with the user device and a current time and weather conditions associated with the current location of the user device; and
   the selected advertisement media file includes a message concerning at least one of the following: the current location, the current time, and the weather conditions.

6. The method of claim 1, wherein:
   the context parameters include a name and a type of the application program running the user device; and
   the selected advertisement media file includes a message concerning the name and the type of the application program.

7. The method of claim 1, wherein:
   the context parameters include metadata of a music record being played back by the application program on the user device; and
   the selected advertisement media file includes a message concerning the metadata of the music record.

8. The method of claim 7, wherein the metadata of the music record include one or more of the following: a genre of the music record, a name of a musical group that created the music record, and a name of a talent singing in the music record.

9. An advertisement provider platform comprising:
   a processor; and
   a memory storing instructions that, when executed by the processor, configure the advertisement provider platform to:
   receive, from an application server being in communication with an application program running on a user device, a request for advertisement, the request including context parameters obtained by the application server via the application program running on the user device;
   select, based on the context parameters, an advertisement media file from a database, the selected advertisement media file being generated, by an Artificial Intelligence (AI) model, based on an advertisement message and the context parameters, wherein:
      the selected advertisement media file includes at least one context part including a text message generated based on the context parameters and pronounced by an artificial voice:
      the artificial voice is generated, by the AI model, from a voice of a host of a podcast media file being played back by the application program running on the user device; and the AI model is trained to:
  extract voice characteristics of the host from the podcast media file; and
  generate, based on the extracted voice characteristics, the at least one context part pronounced by the artificial voice; and
transmit the selected advertisement media file to the application server, wherein the application server is configured to transmit the selected advertisement media file to the user device and the application program running on the user device is configured to play back the selected advertisement media file to a user.

10. The advertisement provider platform of claim 9, wherein the database includes a plurality of advertisement media files pre-generated based on a same advertisement message and different sets of the context parameters.

11. The advertisement provider platform of claim 9, wherein the instructions further configure the advertisement provider platform to:
  determine that the database does not include a pre-generated advertisement media file matching the context parameters; and
  in response to the determination, generate, using the AI model, the advertisement media file based on the advertisement message and the context parameters.

12. The advertisement provider platform of claim 9, wherein the artificial voice is generated, by the AI model, from a voice of a person pronouncing the advertisement message.

13. The advertisement provider platform of claim 9, wherein:
  the context parameters include a current location associated with the user device and a current time and weather conditions associated with the current location of the user device; and
  the selected advertisement media file includes a message concerning at least one of the following: the current location, the current time, and the weather conditions.

14. The advertisement provider platform of claim 9, wherein:
  the context parameters include a name and a type of the application program run the user device; and
  the selected advertisement media file includes a message concerning the name and the type of the application program.

15. The advertisement provider platform of claim 9, wherein:
  the context parameters include metadata of a music record being played back by the application program on the user device; and
  the selected advertisement media file includes a message concerning the metadata of the music record.

16. A non-transitory computer-readable storage medium including instructions that, when executed by a processor of an advertisement provider platform being in communication with an application server that in communication with an application program running on a user device, cause the processor to:
  receive, from the application server, a request for advertisement, the request including context parameters obtained by the application server via the application program running on the user device;
  select, based on the context parameters, an advertisement media file from a database, the selected advertisement media file being generated, by an Artificial Intelligence (AI) model, based on an advertisement message and the context parameters, wherein:
    the selected advertisement media file includes at least one context part including a text message generated based on the context parameters and pronounced by an artificial voice;
    the artificial voice is generated, by the AI model, from a voice of a host of a podcast media file being played back by the application program running on the user device; and
    the AI model is trained to:
      extract voice characteristics of the host from the podcast media file; and
      generate, based on the extracted voice characteristics, the at least one context part pronounced by the artificial voice; and
  transmit the selected advertisement media file to the application server, wherein the application server is configured to transmit the selected advertisement media file to the user device and the application program running on the user device is configured to play back the selected advertisement media file to a user.

* * * * *